(12) United States Patent
Nitawaki (10) Patent No.: US 8,789,634 B2
(45) Date of Patent: Jul. 29, 2014

(54) ELECTRIC VEHICLE

(75) Inventor: Kunihiro Nitawaki, Hamamatsu (JP)

(73) Assignee: Suzuki Motor Corporation (JP)

( * ) Notice: Subject to any disclaimer, the term of this patent is extended or adjusted under 35 U.S.C. 154(b) by 211 days.

(21) Appl. No.: 13/328,398

(22) Filed: Dec. 16, 2011

(65) Prior Publication Data

US 2012/0160584 A1 Jun. 28, 2012

(30) Foreign Application Priority Data

Dec. 28, 2010 (JP) ................................ 2010-292769

(51) Int. Cl.
*B60R 16/04* (2006.01)

(52) U.S. Cl.
USPC ........................................ 180/68.5; 903/907

(58) Field of Classification Search
USPC ............................. 180/68.5, 65.31
See application file for complete search history.

(56) References Cited

U.S. PATENT DOCUMENTS

| | | | | |
|---|---|---|---|---|
| 4,365,681 A * | 12/1982 | Singh | ............................ | 180/68.5 |
| 5,390,754 A * | 2/1995 | Masuyama et al. | .......... | 180/68.5 |
| 5,392,873 A * | 2/1995 | Masuyama et al. | .......... | 180/68.5 |
| 5,501,289 A * | 3/1996 | Nishikawa et al. | .......... | 180/68.5 |
| 5,641,031 A * | 6/1997 | Riemer et al. | ................ | 429/423 |
| 6,227,322 B1 * | 5/2001 | Nishikawa | .................... | 180/68.5 |
| 6,598,691 B2 * | 7/2003 | Mita et al. | ..................... | 180/65.1 |
| 6,978,855 B2 * | 12/2005 | Kubota et al. | ................... | 429/442 |
| 7,540,343 B2 * | 6/2009 | Nakashima et al. | .......... | 180/65.1 |
| 7,610,978 B2 * | 11/2009 | Takasaki et al. | ............. | 180/68.5 |
| 7,654,352 B2 * | 2/2010 | Takasaki et al. | ............. | 180/68.5 |
| 7,743,863 B2 * | 6/2010 | Shindou | ....................... | 180/68.5 |
| 7,896,115 B2 * | 3/2011 | Ono et al. | ................... | 180/65.31 |
| 7,997,368 B2 * | 8/2011 | Takasaki et al. | ............. | 180/68.5 |
| 8,006,793 B2 * | 8/2011 | Heichal et al. | ............... | 180/68.5 |
| 8,079,435 B2 * | 12/2011 | Takasaki et al. | ............. | 180/68.5 |
| 8,210,301 B2 * | 7/2012 | Hashimoto et al. | .......... | 180/68.5 |
| 8,286,743 B2 * | 10/2012 | Rawlinson | .................... | 180/68.5 |
| 8,336,658 B2 * | 12/2012 | Rawlinson et al. | .......... | 180/68.5 |
| 8,464,817 B2 * | 6/2013 | Usami et al. | .................. | 180/68.5 |
| 2008/0000703 A1 * | 1/2008 | Shindou | ......................... | 180/68.5 |
| 2008/0196957 A1 * | 8/2008 | Koike et al. | .................. | 180/68.5 |

(Continued)

FOREIGN PATENT DOCUMENTS

| JP | H9104239 A | 4/1997 |
|---|---|---|
| JP | 2009-083601 | 4/2009 |

OTHER PUBLICATIONS

Office Action corresponding to Japanese Application No. 2010-292769 issued Apr. 11, 2014.

*Primary Examiner* — Jeffrey J Restifo
(74) *Attorney, Agent, or Firm* — Myers Bigel Sibley & Sajovec, P.A.

(57) ABSTRACT

An electric vehicle has a battery pack under a floor panel. The battery pack includes battery modules having an electricity storage function, a first case holding the battery modules therein, and a power shut-off mechanism temporarily interrupting the electric power of the battery modules. The floor panel includes an access port communicating between the inside and outside of a cabin. The battery pack further includes a second case extending upward from an upper surface of the first case adjacent to the floor panel and including the power shut-off mechanism therein. The second case has an opening for allowing the access to the power shut-off mechanism from the outside of the second case, the opening being oriented in an access direction where the power shut-off mechanism is accessed from the access port toward the opening.

3 Claims, 5 Drawing Sheets

(56) References Cited

U.S. PATENT DOCUMENTS

| | | | |
|---|---|---|---|
| 2009/0152034 A1* | 6/2009 | Takasaki et al. | 180/68.5 |
| 2009/0236162 A1* | 9/2009 | Takasaki et al. | 180/68.5 |
| 2009/0242299 A1* | 10/2009 | Takasaki et al. | 180/68.5 |
| 2012/0018238 A1* | 1/2012 | Mizoguchi et al. | 180/68.5 |
| 2012/0055724 A1* | 3/2012 | Iwasa et al. | 180/68.5 |
| 2012/0055725 A1* | 3/2012 | Mizoguchi et al. | 180/68.5 |
| 2012/0160584 A1* | 6/2012 | Nitawaki | 180/68.5 |
| 2013/0153317 A1* | 6/2013 | Rawlinson et al. | 180/68.5 |
| 2013/0192913 A1* | 8/2013 | Joye | 180/68.5 |

* cited by examiner

WATER

-- *PRIOR ART* --

FIG.6

-- PRIOR ART --

FIG.7

ELECTRIC VEHICLE

CROSS-RELATED APPLICATIONS

This application claims priority from Japanese Patent Application No. 2010-292769; filed Dec. 28, 2010, the disclosure of which is incorporated herein by reference in its entirety.

FIELD OF THE INVENTION

The present invention relates to a vehicle having a battery pack as a power source outside of a cabin and, more particularly, to an arrangement and a structure of a service plug of the battery pack.

BACKGROUND OF THE INVENTION

An electric vehicle (referred to as "EV") needs to be equipped with a large capacity battery to ensure a sufficient running distance for practical use. However, the size of the battery itself is increased and thus there is not sufficient space inside a cabin for the battery. Accordingly, the battery is sometimes mounted outside of the cabin, for example, under a floor of the vehicle.

Figure 5:
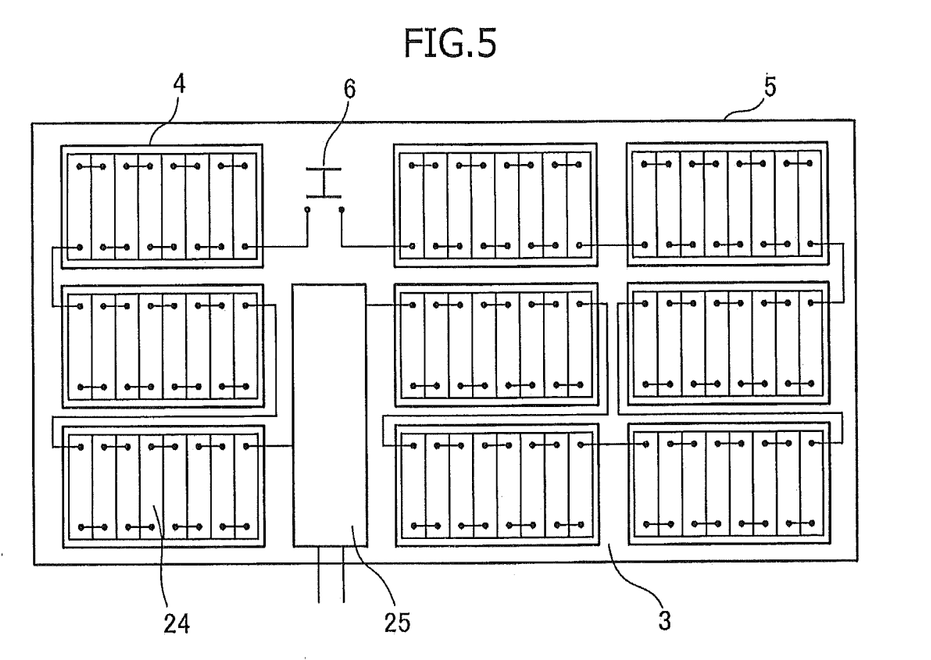
FIG. 5 is a schematic view showing a structure of the battery pack as viewed from the upper side of the vehicle according to the embodiment.

As shown in FIG. 5, battery modules 4, each of which is formed by combining battery cells 24, are surrounded by a battery pack enclosure 5 made of metal or resin to form a battery pack 3. When the battery pack enclosure 5 is mounted outside of the cabin, the battery pack enclosure 5 is waterproofed to prevent electric leakage.

Also, as shown in FIG. 5, an electricity control circuit 25 such as an electricity connection circuit and a control unit is provided inside the battery pack 3. Furthermore, a power shut-off mechanism 6 serving as a service plug for ensuring working efficiency during maintenance is provided by an on-off switch (not shown) at such a position as to divide the voltage of the battery modules 4 connected in series.

BRIEF SUMMARY OF THE INVENTION

Figure 6:
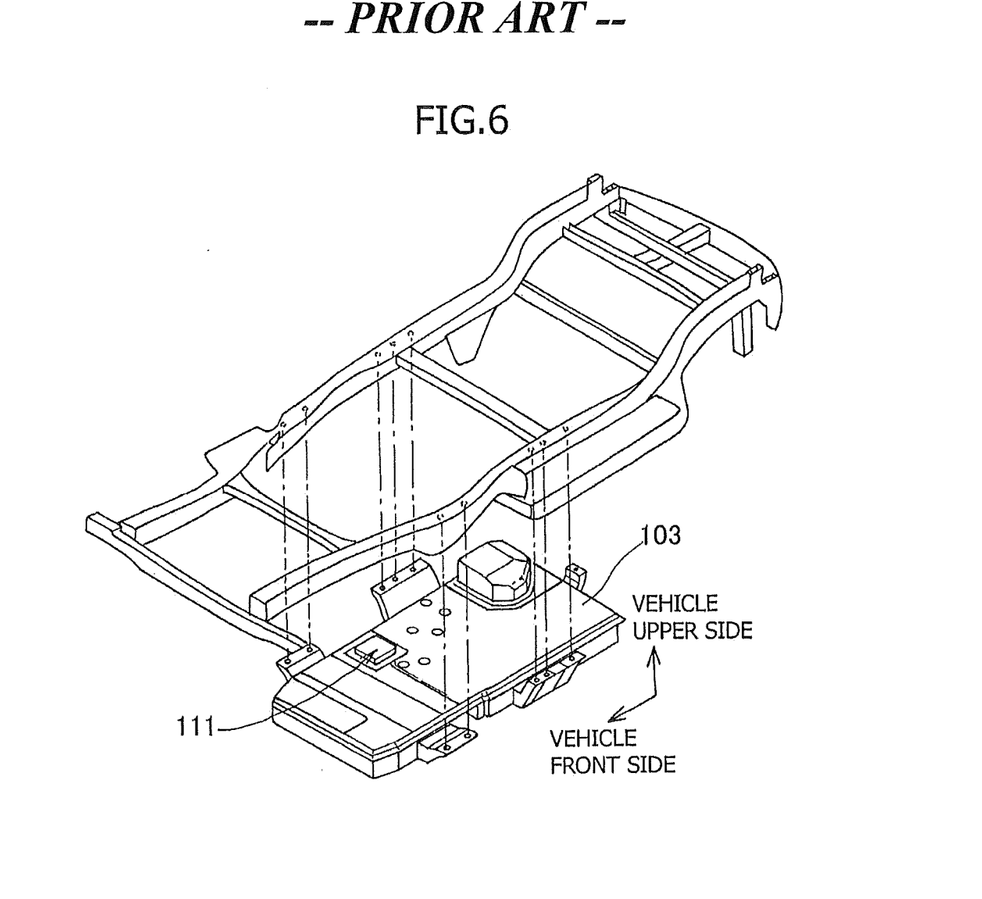
FIG. 6 is a perspective view showing attachment of a battery pack to a lower side of a floor of a vehicle according to a conventional technique.
Figure 7:
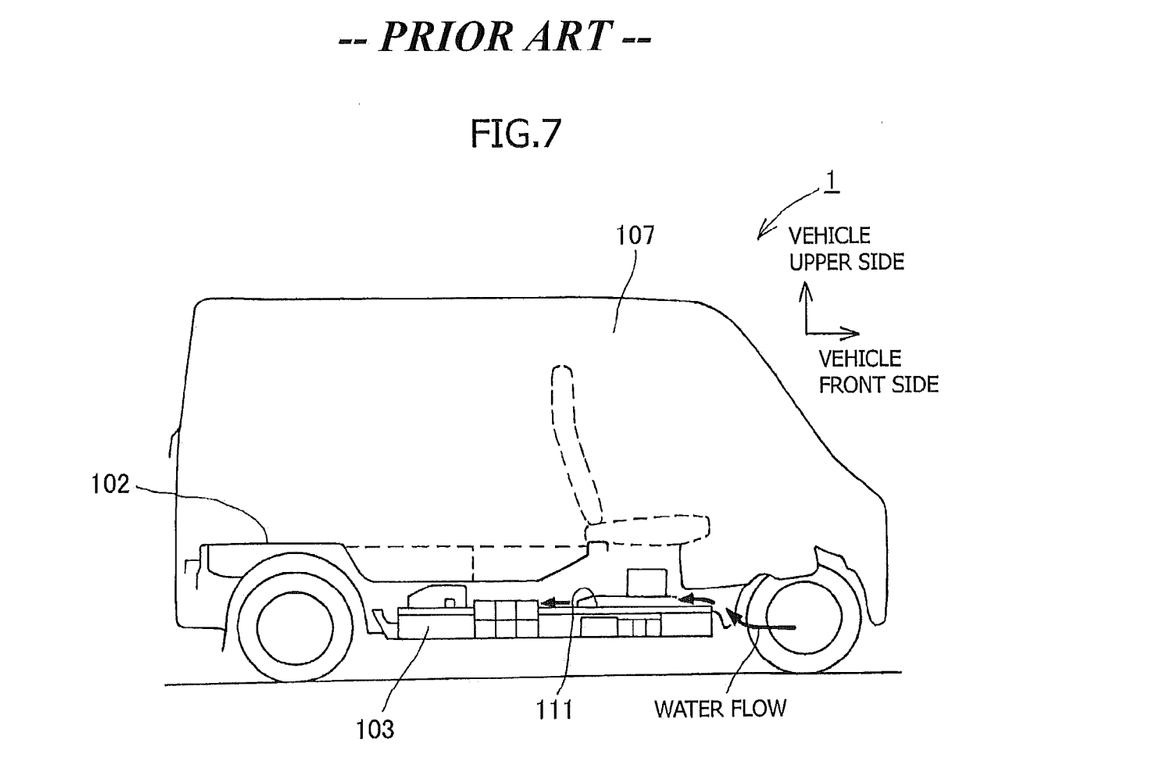
FIG. 7 is a side view of the vehicle showing the battery pack attached to the lower side of the floor of the vehicle.

FIGS. 6 and 7 show a structure of a conventional battery pack 103 provided under a floor panel 102 of a vehicle 101. The battery pack 103 is generally provided along the floor panel 102 of the vehicle 101 for securing a certain capacity and distance from the ground (referred to as "ground height").

Furthermore, the battery pack 103 is provided with a service plug (not shown) for temporarily interrupting the electrical power. For example, the service plug is integrated with the battery pack 103 for reducing the number of assembly steps of the vehicle. The service plug is provided on the upper surface of the battery pack 103 facing the floor panel 102 of the vehicle 101 such that the electrical power of the battery pack 103 can be interrupted from the side close to a cabin 107 during maintenance of the vehicle 101.

The service plug is covered with a service plug lid 111 to prevent electric leakage of the battery pack 103 caused by it being wet with water. However, when the vehicle 101, including such a battery pack 103, travels in the rain or travels on a water-covered road, water may flow on the upper surface of the battery pack 103 from the vehicle front side toward the vehicle rear side as shown by an arrow in FIG. 7. At this time, the service plug and a service plug lid 109 provided on the upper surface of the battery pack 103 may become wet, thereby causing electric alleakage.

In particular, when the floor panel of the vehicle has a shape substantially parallel to the ground, the upper surface of the battery pack is similarly formed to be flat. Accordingly, the service plug provided on the upper surface of the battery pack is far more likely to be wet with water. A waterproof seal or the like may be attached to the service plug lid to prevent water from entering into the battery pack through the service plug lid. However, the service plug lid may easily become wet at any time. Thus, the breakdown of the battery pack may easily occur, which is not desirable.

To solve the above-described problem, JP2009-83601A is known. JP2009-83601A discloses that an opening part for a service plug formed on a battery case of a battery pack provided under a floor panel of a vehicle and a hole formed on the floor panel are connected by an elastically deformable and waterproof boot member, and a waterproof space is provided inside the boot member.

However, JP2009-83601A has inconveniences as follows.

(1) Since the battery pack and the vehicle are connected by the boot member, removing the battery pack from the vehicle requires troublesome work. Furthermore, the boot member may be damaged when the battery pack is removed from or attached to the vehicle. It is difficult to find such damage, and thus the service plug may become wet.

(2) A distance between the opening part for the service plug and the hole formed on the floor panel is restricted to some extent. Since the length of the boot member is increased when the distance is increased, it becomes difficult to check the service plug from an inner side of a cabin, and also the maintenance performance is deteriorated. At this time, a structure for allowing the upper surface of the battery pack to be close to the floor panel is required. However, when such a structure is provided for each vehicle, it is difficult to use the same battery pack for various vehicles having different vehicle body structures, which decreases versatility.

The present invention has been made in view of the above-described circumstances. It is an object of the present invention to provide a structure capable of facilitating access to a service plug from an inner side of a cabin while preventing the service plug from becoming wet, and allowing a battery pack to have broad utility so that the battery pack is applicable to various vehicles.

To eliminate the above-described inconveniences, an electric vehicle of the present invention includes: a cabin; a floor panel defining a bottom surface of the cabin; and a battery pack mounted under the floor panel and serving as a power source of the vehicle, the battery pack including battery modules having an electricity storage function, a first case holding the battery modules therein, and a power shut-off mechanism temporarily interrupting electric power of the battery modules, the floor panel having an access port communicating between an inside and an outside of the cabin, characterized in that the battery pack further includes a second case extending upward from an upper surface of the first case adjacent to the floor panel and including the power shut-off mechanism therein, and the second case has an opening for allowing access to the power shut-off mechanism from the outside of the second case, the opening being oriented in an access direction where the power shut-off mechanism is accessed from the access port toward the opening.

According to the above-described structure, a service plug can be protected from becoming wet by water splash of the battery pack. Also, the occurrence of breakdown of the battery pack can be reduced. In particular, the service plug can be prevented from becoming wet with water flowing on the upper surface of the battery back, which helps to reduce the occurrence of the breakdown of the battery pack.

Furthermore, the service plug is provided above the upper surface of the battery pack and an opening surface of an opening part for the service plug is oriented in an access direction where the service plug is accessed. The access port lies on an extension of the access direction. Thus, the access to the service plug from the inner side of the cabin can be easy.

Also, the vehicle and the battery pack are not connected according to a structure for preventing the service plug from becoming wet. Accordingly, the battery pack is easily removed from the vehicle.

Furthermore, by changing only a service plug enclosure, the battery pack is applicable to various vehicles having different shapes. Thus, the battery pack can have broad utility.

DETAILED DESCRIPTION OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

FIGS. 1 to 5 show an embodiment of the present invention. In FIGS. 1 to 5, reference numeral 1 denotes an electric vehicle (simply referred to as "vehicle"), reference numeral 2 denotes a floor panel of the electric vehicle 1, and reference numeral 3 denotes a battery pack.

The electric vehicle 1 includes the battery pack 3 serving as a power source of the vehicle 1 provided under the floor panel 2 of the vehicle 1.

As shown in FIG. 5, the battery pack 3 includes battery modules 4 having an electricity storage function, a first case (referred to as "battery pack enclosure") 5 holding the battery modules 4 therein, and a power shut-off mechanism (referred to as "service plug") 6 temporarily interrupting the electrical power of the battery modules 4. The floor panel 2 includes an access port 8 communicating between the inside of a cabin 7 and the outside of the cabin 7 of the vehicle 1.

The battery pack 3 includes a second case (referred to as "service plug enclosure") 9 extending upward on the surface of the first case 5 facing the floor panel 2. The second case 9 includes the power shut-off mechanism 6 therein and an opening 10 allowing the access to the power shut-off mechanism 6 from the outside of the second case 9. The opening surface of the opening 10 is opposite to the access direction where the power shut-off mechanism 6 is accessed, while the access port 8 lies on an extension of the access direction.

Figure 1:
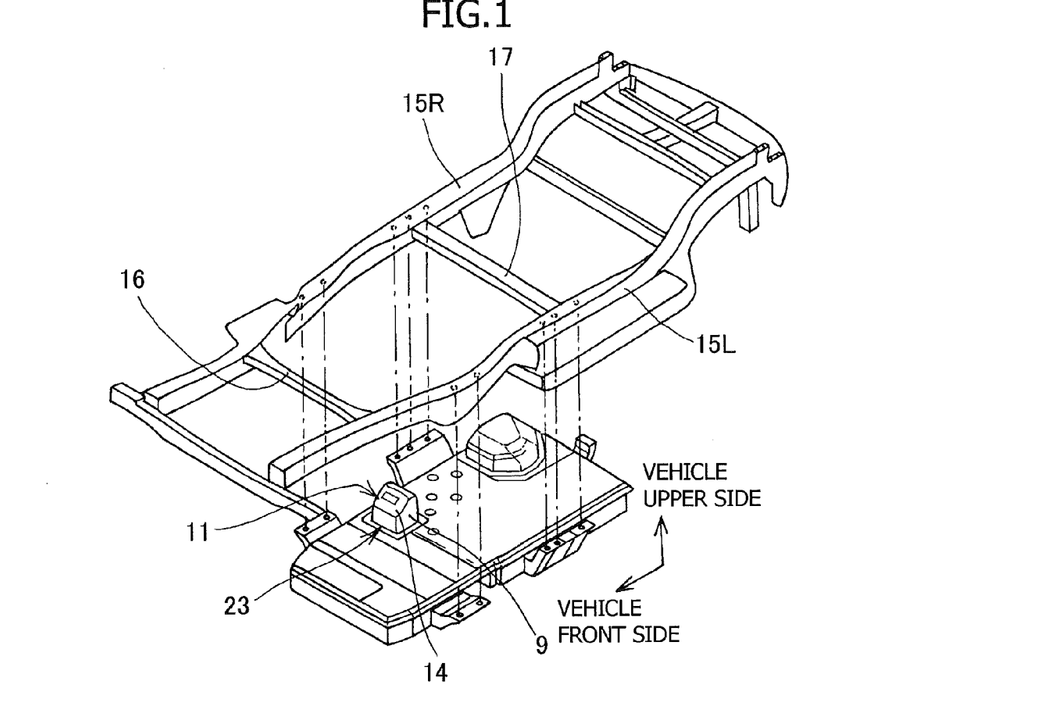
FIG. 1 is a perspective view showing attachment of a battery pack to a lower side of a floor of a vehicle according to an embodiment.
Figure 2:
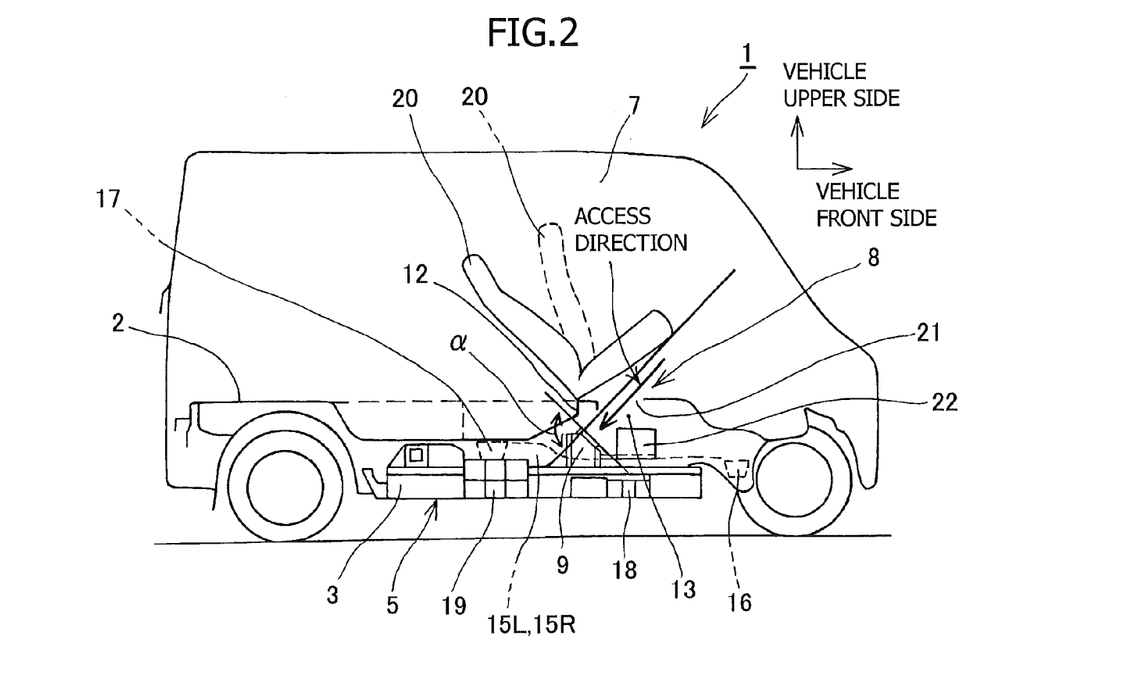
FIG. 2 is a side view of the vehicle showing the battery pack attached to the lower side of the floor of the vehicle according to the embodiment.

More specifically, as shown in FIGS. 1 and 2, the second case 9 is provided on the upper surface of the first case 5 to have a predetermined height. The power shut-off mechanism 6 for temporarily interrupting the electric power of the battery pack 3 is provided inside the second case 9.

Figure 4:
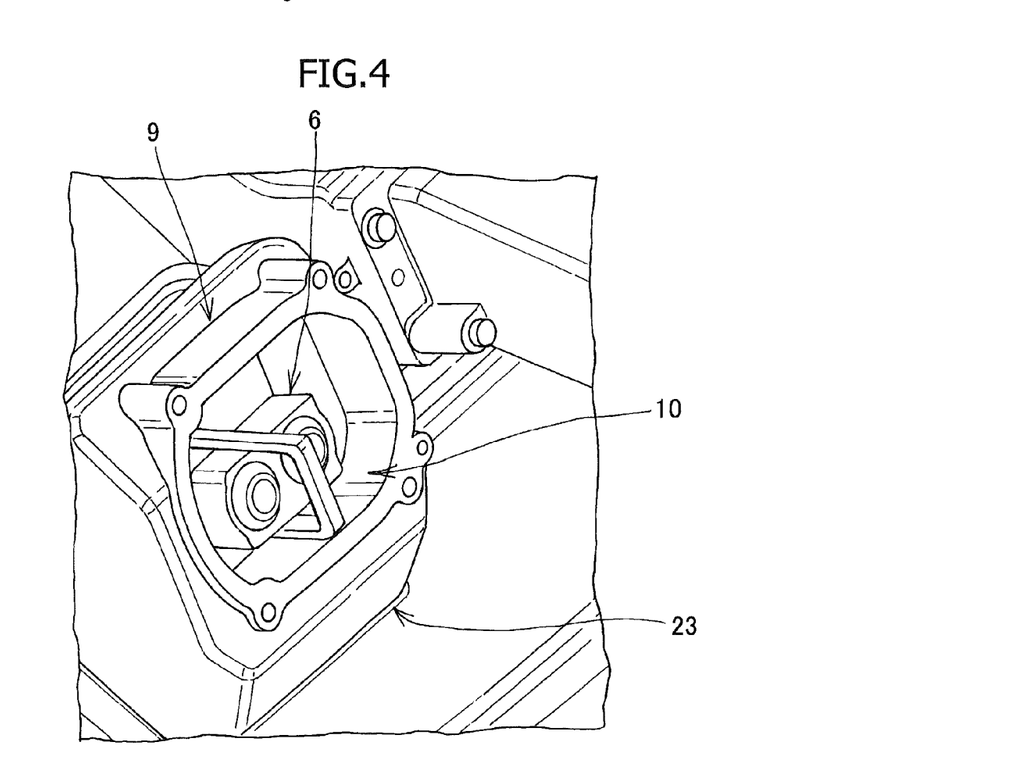
FIG. 4 is a schematic perspective view showing an opening part for a service plug and its surrounding portion according to the embodiment.

As shown in FIG. 4, the opening 10 for the power shut-off mechanism 6, which allows the access to the power shut-off mechanism 6 serving as the service plug from the outside, is provided on the upper side of the second case 9.

The opening surface of the opening 10 for the power shut-off mechanism 6 is provided opposite to the access direction where the power shut-off mechanism 6 is accessed. Furthermore, the access port 8 lies on the extension of the access direction.

Thus, the power shut-off mechanism 6 can be protected from becoming wet due to water splashing on the battery pack 3, and therefore the occurrence of breakdown of the battery pack 3 can be reduced. In particular, the power shut-off mechanism 6 can be prevented from becoming wet with water flowing on the upper surface of the battery pack 3, which helps to reduce the occurrence of breakdown of the battery pack 1

The power shut-off mechanism 6 is provided above the upper surface of the battery pack 3. The opening surface of the opening 10 for the power shut-off mechanism 6 is provided opposite to the access direction where the power shut-off mechanism 6 is accessed, and the access port 8 lies on the extension of the access direction. Thus, the access to the power shut-off mechanism 6 from the inner side of the cabin 7 of the vehicle 1 can be easy.

The vehicle 1 and the battery pack 3 are not connected according to the structure for preventing the power shut-off mechanism 6 from becoming wet. Thus, the battery pack 3 is easily removed from the vehicle 1. Also, by changing only the second case 9, the battery pack 3 is applicable to various vehicles having different body shapes, and thus the battery pack 3 can have broad utility.

Figure 3:
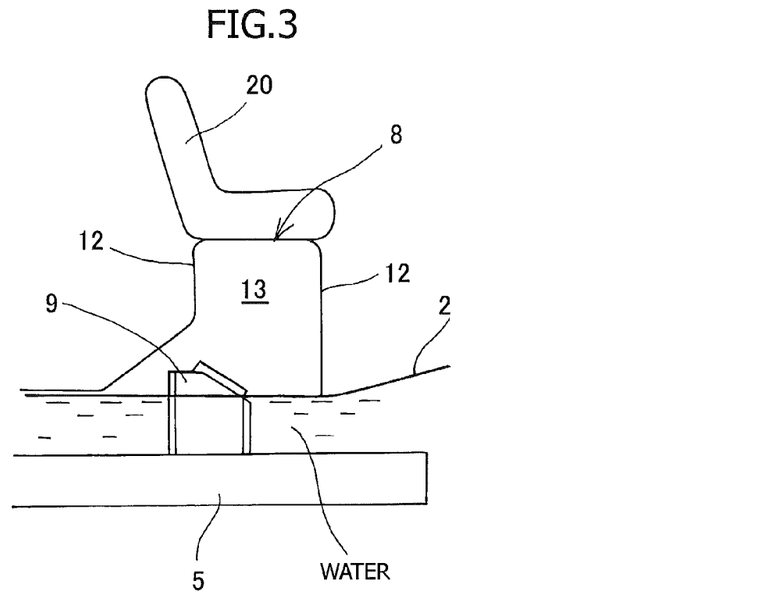
FIG. 3 is an enlarged schematic view for explaining an access port provided under a front seat according to the embodiment.

The second case 9 includes a second case lid (referred to as "service plug lid") 11 covering the opening 10 on the upper side. The access port 8 is positioned above the surface of the surrounding floor panel 2. A vertical wall 12 extends downward in the vertical direction of the vehicle from the vicinity of the surface having the access port 8. The lower end of the vertical wall 12 is connected to the surface of the floor panel 2 surrounding the lower end. The second case lid 11 is located within a space 13 defined by the surface having the access port 8 and the vertical wall 12.

More specifically, the normal direction of the opening surface of the opening 10 for the power shut-off mechanism 6 is directed to the access port 8. The power shut-off mechanism 6 is provided along the opening surface of the opening 10 for the power shut-off mechanism 6 and is inclined relative to the horizontal direction of the vehicle 1. The power shut-off mechanism 6 is positioned to allow the access to the power shut-off mechanism 6 through the opening 10 for the power shut-off mechanism 6 for operation.

The second case lid 11 covering the opening surface of the opening 10 for the power shut-off mechanism 6 is fixed to the second case 9 by a fastening member 14 such as a bolt. The opening 10 for the power shut-off mechanism 6 is covered with the second case lid 11 at any other time but maintenance of the battery pack 3 to prevent the access to and water splashing on the power shut-off mechanism 6.

When the battery pack 3 is attached to the vehicle, the second case 9 is attached to the vehicle such that the front-rear and right-left periphery of the second case 9 is positioned in an area defined by a left side frame 15L and a right side frame 15R of the vehicle and first and second cross members 16 and 17 which are cross members located sequentially from the front side toward the rear side. Incidentally, the battery pack 3 is attached to the rear side of the first cross member 16 by a first attachment bracket 18 and is attached to the lower side of the second cross member 17 by a second attachment bracket 19.

Furthermore, the second case 9 is vertically partitioned by the floor panel 2 of the vehicle 1 and the upper surface of the first case 5, and accordingly, is disposed in a closed space. Thus, the power shut-off mechanism 6 can be protected from becoming wet.

The power shut-off mechanism 6 is accessed from the inner side of the cabin 7 through the access port 8 provided on the floor panel 2. The access port 8 is covered with a front seat 20 at any time other than when performing maintenance on the battery pack 3. As shown in FIG. 2, the power shut-off mechanism 6 can be accessed through the access port 8 by rotating the front seat 20 backwardly at the time of maintenance of the battery pack 3.

Furthermore, the access port 8 is positioned above the periphery of the floor panel 2 on which the access port 8 is provided. More specifically, as shown in FIG. 3, the vertical wall 12 extending upwardly is provided on the periphery of the access port 8. Since the access port 8 is positioned above the surrounding floor panel 2 in the vehicle, the space 13 is provided by the surface having the access port 8 and the vertical wall 12 surrounding the access port 8 as shown in FIG. 3.

In the present invention, the second case lid 11 is located inside the space 13. Since the second case lid 11 is positioned above the floor panel 2 provided on the front side of the space 13, the second case lid 11 positioned above the floor panel 2 provided on the front side of the space 13 can be prevented from becoming wet.

Also, even when the vehicle 1 travels on a water-covered road, air is accumulated within the space 13 and therefore the second case lid 11 and the power shut-off mechanism 6 can be protected from becoming wet. The space 13 defined by the surface having the access port 8 and the vertical wall 12 surrounding the access port 8 is positioned above the surrounding floor panel 2. Accordingly, even when water arrives at the surrounding floor panel 2, water immersion can be alleviated because air is accumulated within the space 13. Also, by positioning the second case lid 11 in the space 13, the power shut-off mechanism 6 can be protected from becoming wet.

At least part of the opening 10 in the horizontal direction of the vehicle is provided on the rear side of an opening part 21 of the access port 8, and an accessory component 22 is provided on the front side of the second case 9. The second case 9 is offset on the rear side of the vehicle relative to the opening part 21 of the access port 8. At this time, at least part of the opening 10 for the power shut-off mechanism 6 is positioned on the rear side of the access port 8. Also, the upper portion of the second case 9 having the opening 10 for the power shut-off mechanism 6 for allowing the access to the power shut-off mechanism 6 is inclined toward the access port 8 in the horizontal direction of the vehicle.

A first purpose of adopting the above-described structure is to allow the front seat 18 serving as the lid of the access port 8 on the upper side of the access port 8 to be inclined toward the rear side of the vehicle. The front seat 18 is inclined toward the rear side of the vehicle to allow the access to the power shut-off mechanism 6 from the upper and front side of the access port 8. The upper portion of the second case 9 having the opening 10 for the power shut-off mechanism 6 is directed to the upper and front side of the access port 8 in view of the access direction. More specifically, the upper portion of the second case 9 is inclined to have an approximately right angle α relative to a bottom surface of the front seat 18 when the front seat 18 is inclined backwardly.

A second purpose is to allow the access to a plurality of components through the access port 8. The accessory component is provided on the front side of the second case 9, and the accessory component 22 can be accessed through the access port 8.

Furthermore, a third purpose is to prevent the second case 9 from becoming wet directly. As shown in FIG. 4, the accessory component 22 is provided on the front side of the second case 9 to receive water delivered on the upper surface of the first case 5 from the front side of the vehicle. Thus, the second case 9 can be prevented from becoming wet directly, and therefore the risk of breakdown of the battery pack 3 can be reduced. Thus, the access to the power shut-off mechanism 6 and the accessory component 22 from the inner side of the cabin 7 of the vehicle 1 can be allowed, while the second case 9 can be prevented from becoming wet directly by the accessory component 22 positioned on the front side of the power shut-off mechanism 6.

According to the above-described structure, the following advantages can be obtained.

Since the second case 9 is protruded from the upper surface of the first case 5 and the opening 10 for the power shut-off mechanism 6 is positioned above the upper surface of the first case 5, the power shut-off mechanism 6 can be protected from becoming wet with water flowing on the upper surface of the first case 5.

Since the periphery of the second case 9 is disposed in the area partitioned by the left side frame 15L and the right side frame 15R of the vehicle 1 and the first and second cross members 16 and 17 while the battery pack 3 is attached to the vehicle 1, the second case 9 can be prevented from becoming wet directly.

The access port 8 provided on the floor panel 2 is positioned above the surrounding floor panel 2, and the vertical wall 12 horizontally extends around the access port 8. Since the space is formed by the surface having the access port 8 and the vertical wall 12 and the second case lid 11 covering the opening 10 for the power shut-off mechanism 6 is disposed inside the space 13, the power shut-off mechanism 6 can be protected from becoming wet.

Furthermore, the upper portion of the second case 9 having the opening 10 for the power shut-off mechanism 6 is directed to the upper and front side of the access port 8. Even when the access port 8 cannot be completely opened by removing the member covering the access port 8, the power shut-off mechanism 6 is accessible and operable.

The second case 9 can be offset to the rear side of the vehicle relative to the access port 8 and the accessory component 22 and the like can be disposed on the front side of the second case 9. The access to the accessory component 22 through the access port 8 is possible.

Since the accessory component 22 positioned on the front side of the second case 9 receives the water flowing from the front side of the vehicle, the second case 9 can be prevented from becoming wet directly. Furthermore, the maintenance of the accessory component 22 positioned on the front side of the second case 9 can be performed from the inner side of the cabin 7 of the vehicle 1.

By changing only the second case 9, the same battery pack 3 can be applied to various vehicles. The battery pack 3 can have broad utility. Also, since it is not necessary that the battery pack 3 and the second case 9 be removed, a connection part 23 for connecting the second case 9 and the battery pack 3 can have a sealing structure for preventing water splashing and thus high water-proofness can be obtained.

For example, the present invention can be applied to not only an electric vehicle but also to a vehicle including a battery pack outside of a cabin such as a hybrid electric vehicle (referred to as "HEV") and a fuel cell electric vehicle (referred to as "FCEV"). At this time, the form of a service plug is not particularly limited. For example, the service plug may be a component having an on-off function such as a plug or a breaker switch.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. An electric vehicle comprising:
   a cabin;
   a floor panel defining a bottom surface of the cabin; and
   a battery pack mounted under the floor panel and serving as a power source of the vehicle,
   the battery pack including battery modules having an electricity storage function, a first case holding the battery modules therein, and a power shut-off mechanism temporarily interrupting electric power of the battery modules,
   the floor panel having an access port communicating between an inside and an outside of the cabin, and
   the battery pack further including a second case extending upward from an upper surface of the first case adjacent to the floor panel and including the power shut-off mechanism therein, and the second case having an opening for allowing access to the power shut-off mechanism from an outside of the second case, the opening being oriented in an access direction where the power shut-off mechanism is accessed from the access port toward the opening.

2. The electric vehicle according to claim 1, wherein a second case lid covering the opening is provided on an upper portion of the second case, the access port is provided on an upper surface of a portion surrounded by a vertical wall extending upward from the floor panel, and the second case lid is positioned within a space defined by the upper surface and the vertical wall.

3. The electric vehicle according to claim 1, wherein the opening is positioned on a rear side of the access port, and an accessory component is positioned on a front side of the second case.

\* \* \* \* \*

UNITED STATES PATENT AND TRADEMARK OFFICE
CERTIFICATE OF CORRECTION

| | | |
|---|---|---|
| PATENT NO. | : 8,789,634 B2 | Page 1 of 1 |
| APPLICATION NO. | : 13/328398 | |
| DATED | : July 29, 2014 | |
| INVENTOR(S) | : Nitawaki | |

It is certified that error appears in the above-identified patent and that said Letters Patent is hereby corrected as shown below:

In the Specification: Column 4, Lines 38 and 39:

Please correct "of the battery pack 1." to read -- of the battery pack 3. --

Signed and Sealed this
Sixth Day of January, 2015

Michelle K. Lee
*Deputy Director of the United States Patent and Trademark Office*